United States Patent [19]

Storer et al.

[11] Patent Number: 4,463,422
[45] Date of Patent: Jul. 31, 1984

[54] METHOD OF PROCESSING AN ITERATIVE PROGRAM LOOP

[75] Inventors: James E. Storer, Lexington; James A. Waggett, Concord, both of Mass.

[73] Assignee: CSP, Inc., Billerica, Mass.

[21] Appl. No.: 397,470

[22] Filed: Jul. 12, 1982

[51] Int. Cl.³ .............................................. G06F 9/30
[52] U.S. Cl. .................................................. 364/300
[58] Field of Search ................................ 364/200, 300

[56] References Cited

U.S. PATENT DOCUMENTS 4,097,920  6/1978  Ozga ..................................... 364/200

Primary Examiner—Raulfe B. Zache
Attorney, Agent, or Firm—Schiller & Pandiscio

[57] ABSTRACT

A method for speeding up computer execution of short, highly repetitive program loops, wherein the method involves storing the address of the first instruction in the program loop in the stack of a control element before the loop is run, and thereafter generating that address when it is needed to restart processing of the loop by holding the stack and reading its value into the control element's register.

3 Claims, 1 Drawing Figure

METHOD OF PROCESSING AN ITERATIVE PROGRAM LOOP

FIELD OF THE INVENTION

This invention relates to digital computers in general, and more particularly to methods for speeding up computer execution of short, highly repetitive program loops.

BACKGROUND OF THE INVENTION

It is common in many computer applications, particularly those which are arithmetically and logically intensive, to have one or more program loops in the instruction program. Such program loops are essentially self-contained sequences of instructions in which the last instruction in the sequence repeatedly causes the program to return to the first instruction in the sequence until a terminal condition is reached. When the terminal condition occurs, however, the last instruction in the sequence causes the program to "fall through" the program loop and continue on with the remainder of the instruction program. Program loops are an extremely useful programming tool in that they allow an instruction program to guide a computer through highly iterative computations in a relatively economical fashion.

For purposes of exposition, a typical program loop is contained in the exemplary instruction program segment shown in Table I as follows:

TABLE I

| Instruction Number | Actual Instruction | Comments |
|---|---|---|
| . | | |
| . | | |
| 41 | CTR ← 1000 | ;CTR = counter |
| 42 | Subtract ( ) | ;useful instruction |
| 43 | Multiply ( ) | ;useful instruction |
| 44 | Add ( ) | ;useful instruction |
| 45 | CTR ← CTR-1,JumpGZ(42) | ;Decrement counter, ;Test if Zero, ;if not Zero, go to 42 ;if Zero, go to 46 |
| 46 | Add ( ) | ;useful instruction |
| . | | |

In this instruction program segment, the program loop consists of instructions 42-45 and is designed to perform the subtract, multiply and add operations of instructions 42-44 one thousand times in sequence before the program moves on to instruction 46. To this end instruction 41 orders the computer to load a loop counter with the value 1000 representing the number of times the program loop is to be run. Instruction 42 orders the computer to perform the desired subtract operation. Instruction 43 orders the computer to perform the desired multiply operation. Instruction 44 orders the computer to perform the desired add operation. Instruction 45 orders the computer to perform a multi-part operation: first, it orders the computer to decrement the loop counter by 1, second, it orders the computer then to test the counter for the counter's value after decrementing, and third, it orders the computer to either return the program to instruction 42 if the counter's value is not zero after the decrementing step or to let the program fall through the loop to instruction 46 if the counter's value is zero after the decrementing step. When a computer processes the instruction program segment shown in Table I, it will perform the subtract, multiply and add operations of instructions 42-44 one thousand times in sequence before it moves on to perform the operation specified in instruction 46.

For the computer to perform the subtract, multiply and add operations of instructions 42-44 one thousand times in sequence, the computer must process instruction 41 once, and instructions 42-45 one thousand times. Of the various instructions contained inside the loop, three of the instructions (42-44) specify the desired computational operations (so-called "useful" instructions) and one instruction (45) performs internal counting, testing and jumping operations (a so-called "housekeeping" instruction). To some extent, housekeeping instruction 45 does not cause the computer to do the operational work required by the iterative computation. Rather, like instruction 41, instruction 45 is in the program simply to cause the computer to run the useful instructions 42-44 in the program loop the desired number of times before the computer leaves the loop and goes on to execute instruction 46. However, unlike instruction 41 which is outside the program loop and hence is only run once, instruction 45 is within the program loop and thus runs every time the loop runs.

In a relatively long program loop (e.g. 50 instructions) not run often (e.g. only 5 times), a single housekeeping instruction inside the loop does not add materially to the computer's processing time. However, in arithmetically and logically intensive applications such as scientific work, very short program loops (e.g. 4 instructions) are quite common and they must frequently be run many times (e.g. 1000 times). In these situations, inclusion of the housekeeping instruction within the program loop can add significantly and undesirably to the computer's processing time. For example, in the instruction program segment shown in Table I, if instructions 42-45 all require equal time for the machine to execute, 25% of the machine's processing time would be tied up with running the housekeeping instruction. In this respect it must also be appreciated that the housekeeping instruction can be a relatively slow one to process, since it requires the computer to execute the multiple steps of (a) decrementing the loop counter, (b) testing the value of the loop counter after decrementing, and (c) executing a jump back or fall through operation depending on the value of the loop counter after decrementing. Also, the conditional jump portion of the housekeeping instruction requires the latter to specify the jump location which the program must go to if the counter is not zero. The conditional jump portion of the housekeeping instruction may be quite lengthy and slow to process.

For these reasons it has been appreciated that if one could shorten or eliminate the housekeeping instruction in the loop, the time needed to execute the loop can be reduced significantly. Thus many computers are built with special hardware components added to the computer to allow elimination of the housekeeping instruction from the loop. This hardware generally comprises sufficient storage and control circuitry so that the computer can execute an operation as follows: "do instructions 42, 43, 44 1000 times, then fall through to instruction 46". In such an arrangement the computer does not need to process the complex conditional jump instruction every time it passes through the loop, and thus processing time for the loop is reduced. However, this solution has the significant disadvantage that additional hardware must be built into the computer with consequent extra cost.

OBJECT OF THE PRESENT INVENTION

As a result, the principle object of the present invention is to provide a method whereby, without the addition of any special hardware components, computer execution of short, highly repetitive program loops can be significantly speeded up.

SUMMARY OF THE INVENTION

The present invention involves utilizing, in a novel fashion, standard hardware already built into a typical digital computer, so that the housekeeping instruction in a program loop can be simplified and thus processed with greater speed, in order that the overall time needed to run all the instructions in the loop can be significantly reduced.

The invention uses a standard control element, already built into the computer to generate instruction program addresses, in a novel manner so that the housekeeping instruction in a program loop is modified, thereby permitting the loop to be processed in a shorter time. The method involves storing in the control element's stack, the address value of the first instruction in the loop, so that when the counter indicates that the loop should be run again, the address value of that first instruction in the loop will be readily available within the control element. As a result, the housekeeping instruction no longer needs to specify the jump location within the instruction itself, and this jump location need not be processed every time the housekeeping instruction is processed; despite the fact that the housekeeping instruction still lies within the loop and is processed with each run through the loop, the overall processing time of the loop is reduced without the extra cost of added hardware.

BRIEF DESCRIPTION OF THE DRAWINGS

Still other objects and features of the present invention will be more fully described or rendered obvious in the following detailed description of the preferred embodiment, which is to be read together with the accompanying drawings wherein.

DETAILED DESCRIPTION OF THE PREFERRED EMBODIMENT

Figure 1:
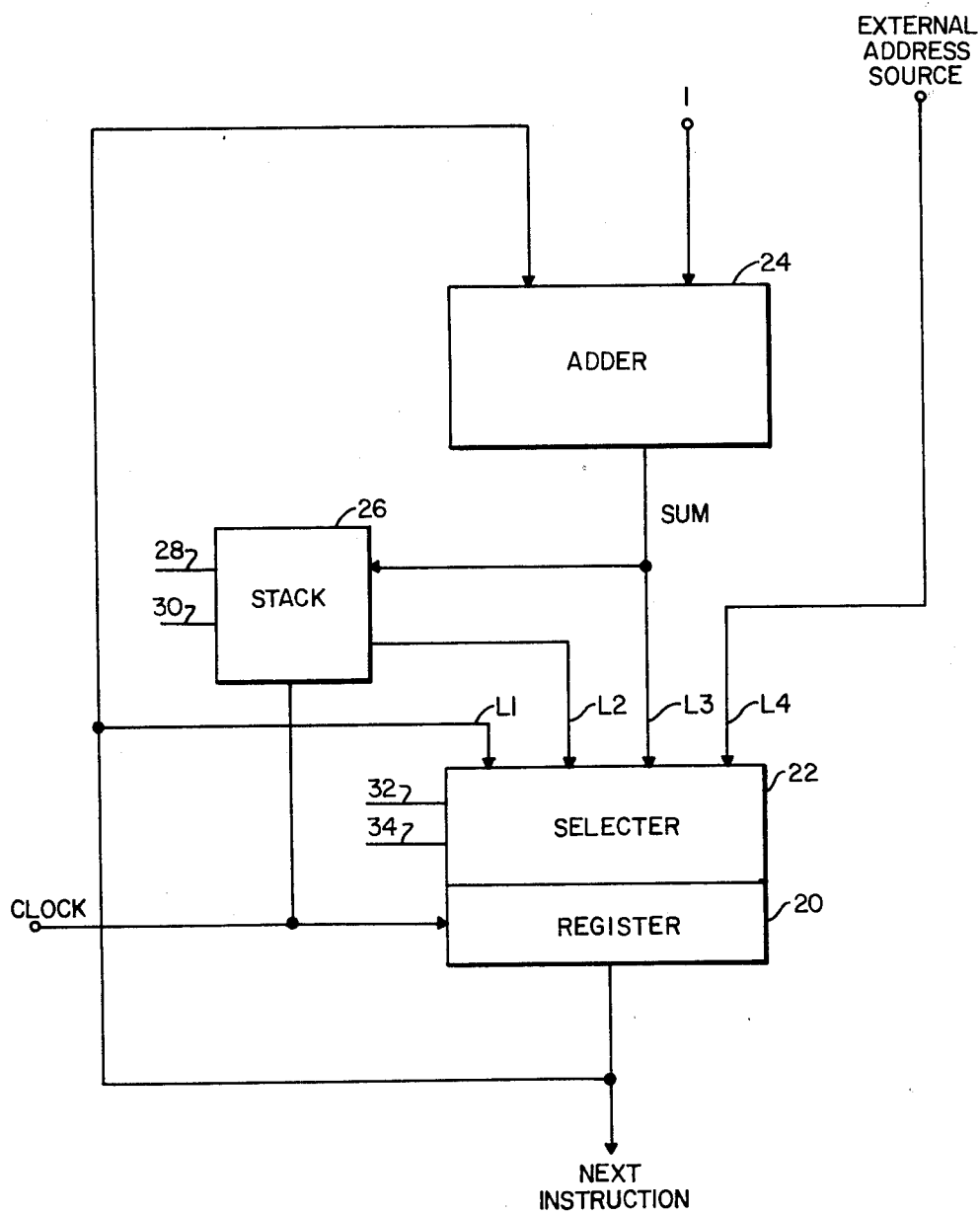
FIG. 1 is a simplified block diagram of a typical control element.

Many computers now have control elements built into them as part of the computer's control circuitry. These control elements serve to generate instruction program addresses for the computer so the computer will know what instruction it should be processing at a given time. While many different control element designs are known, they all generally share some basic common features and components.

FIG. 1 shows a simplified diagram of a typical control element. This simplified diagram is based on the architecture of the 4-Bit-Slice Expandable Control Element Type 74S482 manufactured by Texas Instruments, Inc., and is fairly representative of the typical control element. The control element includes register 20 for holding the number of the next instruction to be executed, and a selection logic component 22 (or "selecter") for deciding which one of four sources of instruction addresses will be used to load the register. A first source of instruction addresses is an external address source which is coupled to the selecter via line L4. A second source of instruction addresses is adder 24 which is designed to increment by one the instruction number in the register. The output from adder 24 is fed to selecter 22 through line L3. A third source of instruction addresses is stack 26, which is essentially a known type of LIFO (last in—first out) memory. By stimulating stack 26 by appropriate signals applied either at control line 28 and/or line 30, the stack can be made to either (a) "push", i.e., place the sum being computed by adder 24 on the top of the numbers stored in stack 26, (b) "pop", i.e. remove the top number stored in the stack from the stack, (c) "hold", i.e. do nothing, or (d) "replace", i.e. replace the last number stored in the stack with the sum computed by the adder. The output from stack 26 is fed to the selecter by line L2. The fourth source of instruction addresses is return line L1, which is intended to carry a signal which basically returns the number in register 20 to the latter. By appropriately stimulating selecter 22 through control lines 32 and/or 34, the selector is instructed which of the lines L1–L4 is to be used to load the register. As is well known in the art, the computer is instructed by detailed machine coding associated with each of the program instructions, precisely what signals it should send along control lines 28, 30, 32 and 34 at any given time so as to operate the various elements of the control element appropriately.

In fulfilling its function of generating instruction program addresses, the control element typically has four basic operations. When the program requires normal sequencing, i.e. when the program wants the computer to execute the immediately higher instruction next, selector 22 chooses line L3 as the feed for register 20 and stack 26 is instructed to hold. When the program specifies a jump command, i.e. "JUMP(ADDR)" where the instruction tells the hardware to execute as its next instruction that number which is ADDR, the selecter chooses L4 as the feed for the register and the stack is instructed to hold. When the program specifies a call command, i.e. "CALL(ADDR)" where the instruction instructs the hardware to execute as its next instruction that number which is ADDR, and also to store in the stack the number resulting from the adder, the selecter chooses L4 as the feed for the register and the sum at the output of the adder is pushed onto the stack. Finally, when the program specifies a return command, i.e. "RETURN" where the instruction instructs the hardware to use the number on the top of the stack as the next instruction and pop the stack, the selector chooses L2 as the feed source for the register and pops the stack.

When implementing the instruction program segment illustrated in Table I, the control element would operate as follows. As each of the instructions 41–44 was executed, the machine code associated with each of these program instructions would instruct the hardware to generate the necessary signals along control lines 28, 30, 32 and 34 so that the control element would conduct normal sequencing, i.e. the selecter would choose line L3 as the source of the next instruction address to be fed into the register. In this way instruction 41 would be followed by instruction 42, instruction 42 would be followed by instruction 43, instruction 43 would be followed by instruction 44, and instruction 44 would be followed by instruction 45. At the housekeeping instruction 45, however, the machine code associated with the jump instruction would instruct the hardware to generate the necessary signals along control lines 28, 30, 32 and 34 so that the selecter would use line L3 as the feed for the register if there is to be a fall through out of the loop to instruction 46, or use line L4 as the feed for the register if there is to be a jump back to instruction 42. Of course, the jump instruction is also required to make the number 42 available from the external address source in order for the jump back to instruction 42 to be possible.

The present invention uses a modification of these principles to reduce the time needed to process a program loop. The instruction program segment shown in following Table II illustrates how the new method can be used to perform the same iterative calculations as were performed in the program segment shown in Table I, but in less time:

TABLE II

| Instruction Number | Actual Instruction | Comments |
|---|---|---|
| . | | |
| 51 | CTR ← 1000 | ;set counter to 1000 |
| 52 | CALL (53) | ;store sum (52 + 1) in stack |
| 53 | SUBTRACT( ) | ;useful operation |
| 54 | MULTIPLY( ) | ;useful operation |
| 55 | ADDJR( ) | ;useful operation plus ;decrement counter ;test if Zero ;if not Zero, go to 53 ;if Zero, go to 56 |
| 56 | ADD | ;useful operation |
| . | | |

In this new instruction program segment, the program loop consists of instructions 53–55 and, when combined with instructions 51 and 52 in the manner shown in Table II, serves to instruct the computer to perform the subtract, multiply and add operations of instructions 53–55 one thousand times in sequence before the program moves on to instruction 56. To this end instruction 51 instructs the computer to load a loop counter with the value 1000 representing the number of times the program loop is to be run. As known in the art, lines 32 and 34 are appropriately stimulated at the end of instruction 51 so that the control element's selecter 22 selects line L3 as the source of the next instruction address. This causes the sum (51+1) to be loaded into register 20 from adder 24 and instruction 52 is the next instruction executed. Instruction 52 instructs the computer to perform a call operation of the type previously described. Consequently, in response to proper stimulus on lines 28 and 30 from the computer, the sum (52+1) is pushed onto stack 26 from adder 24, and register 20 is loaded with the value specified in the call instruction (i.e., 53) by instructing selecter 22 to activate line L4. As a result, the sum (52+1), or 53, is stored in stack 26, and also instruction 53 is the next instruction executed. Instruction 53 instructs the computer to perform the desired subtract operation. At the end of instruction 53, the input control lines to selecter 22 are stimulated so that line L3 is selected as the source of the next instruction address. The sum (53+1) is thus loaded into register 20 from adder 24, and instruction 54 is the next instruction executed. Instruction 54 instructs the computer to perform the desired multiply operation. At the end of this instruction, the control element's selecter 22 selects line L3 as the source of the next instruction address, causing the sum (54+1) to be loaded into register 20 from adder 24. Instruction 55 is then the next instruction executed. Instruction 55 tells the computer to perform a multipart operation: to perform the desired add operation; to decrement the loop counter by 1; to test the counter for the counter's value after decrementing; and lastly, to either return the program to instruction 53 if the counter's value is not zero after decrementing, or to let the program fall through the loop to instruction 56 if the counter's value is zero after decrementing. The method by which this last operation is accomplished is unique, however. In the conventional program illustrated in Table I, this jump back or fall through operation is achieved by having selecter 22 select either line L4 or line L3 respectively as the feed for loading register 20. In the present method, however, this jump back or fall through operation is accomplished in a far superior manner. If the counter test indicates a fall through to instruction 56 is desired, the selecter still uses line L3 as the source for the register. If the test indicates a jump back, however, the conventional, time-consuming procedure of supplying the value of the jumped-to address to the external address source and drawing it from the external address source by line L4 is not done. Instead, the machine code associated with program instruction 55 would instruct the hardware to generate the necessary signals among control lines 28, 30, 32 and 34 so that stack 26 is simply held and the value at the top of the stack is read into register 20 by selecter 22 and line L2. Since the value at the top of the stack is 53 (due to the call operation executed in instruction 52), register 20 is loaded with the value 53 and instruction 53 is the next instruction executed. Thus, the jump back operation needed to repeat the loop has been accomplished in an exceptionally fast and simple manner.

It is to be noted that stack 26 is not popped by the jump back portion of instruction 55, however, as is done in a conventional subroutine return, since this would delete the instruction address value stored in the stack and would not permit repeat processing of the loop in the manner previously described. Instead, the stack is held and merely read into register 20 to accomplish the jump back to the start of the loop. As a result, the stack keeps as its top value the instruction address 53 so that repeated jumps back to instruction 53 can be performed in the future. Of course, the stack can be safely popped when the test of the loop counter indicates that the counter's value is zero and a fall through to instruction 56 is desired.

ADVANTAGES OF THE PRESENT INVENTION

While the present method entails the addition of an extra step at the front side of the loop, i.e. the call operation in instruction 52 which loads the stack, it results in superior address generation within the loop itself, since the jump back address is already within the control element's stack and does not have to brought in from an external address source via the lengthy and cumbersome jump instruction. This advantage can far outweigh the processing of an extra "non-loop" instruction where the loop being processed is short and must be run many times.

What I claim is:

1. A method of operating a digital computer of the type having a control element for generating instruction addresses, wherein the control element comprises an adder, a stack, a selecter and a register, so as to facilitate computer execution of short, highly repetitive program loops, said method including the steps of (a) initially storing the address of the first instruction in the program loop in the stack before said loop is entered and before said first instruction in said loop is executed, and (b) thereafter generating the instruction address required in a fall through operation out of the loop, by loading the register with a sum obtained from the adder, and generating the instruction address required in a jump back operation to rerun the loop by loading the register with the value previously stored in said stack, said stack being held during this loading operation so that the value representing the address of the first instruction of the loop is left intact within said stack so as to be available for future reference.

2. A method according to claim 1 wherein the initial storing of the address of the first instruction in the program loop in the stack is accomplished by pushing the sum computed in the adder onto the stack.

3. A method according to claim 1 wherein the initial storing of the address of the first instruction in the program loop in the stack is accomplished by executing a "call" operation.

* * * * *